UNITED STATES PATENT OFFICE.

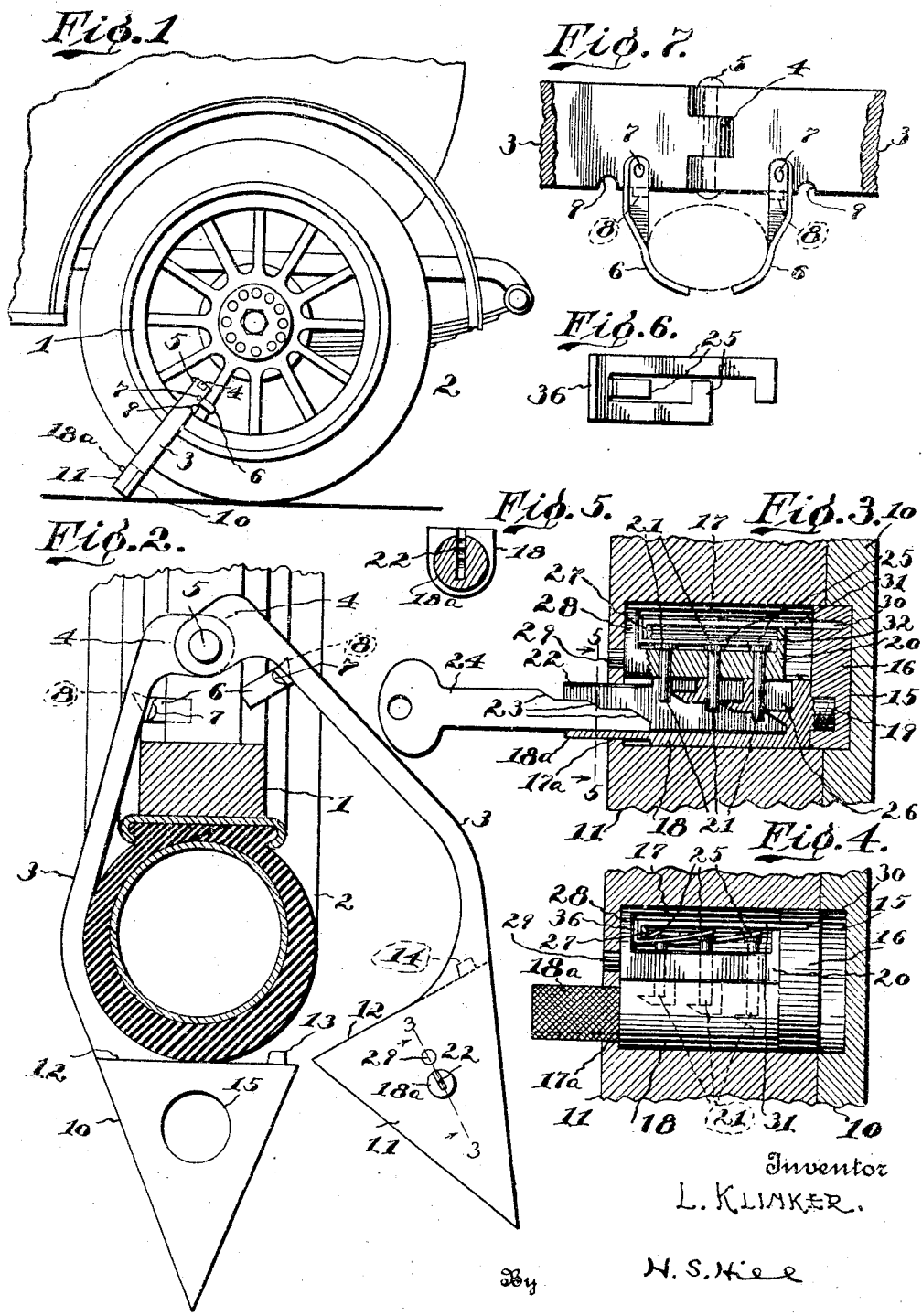

LAWRENCE KLINKER, OF SAN FRANCISCO, CALIFORNIA.

WHEEL-LOCK.

1,311,404.  Specification of Letters Patent.  Patented July 29, 1919.

Application filed May 8, 1919. Serial No. 295,632.

*To all whom it may concern:*

Be it known that I, LAWRENCE KLINKER, a citizen of the United States, residing at San Francisco, in the county of San Francisco, State of California, have invented a new and useful Wheel-Lock; and I do hereby declare the following to be a full, clear, and exact description of the invention, such as will enable others skilled in the art to which it appertains to make and use the same.

The present invention relates to a device for preventing the theft of automobiles and like vehicles, and has for its object to provide a device of this character which embodies novel features of construction whereby it can be readily applied to the rim and tire of one of the wheels and will make it practically impossible for an unauthorized party to move the automobile or vehicle without attracting attention and making detection practically certain.

Further objects of the invention are to provide an automobile theft preventing device of this character which can be collapsed in a small amount of space and easily carried from place to place when not in use, which can be quickly placed in position or removed therefrom, and which can not be moved or turned into an inoperative position by some subterfuge such as deflating the tires.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of the rear end of a conventional automobile, showing a wheel lock constructed in accordance with the invention applied to one of the wheels.

Fig. 2 is a transverse sectional view through a portion of the tire and wheel rim, the wheel lock being shown in a position preparatory to locking the same to the wheel, in side elavation.

Fig. 3 is a transverse vertical sectional view through the outer end of the wheel lock taken on the line 3—3 of Fig. 2, with the two shackle bars locked together.

Fig. 4 is a similar view with the locking bolt withdrawn and the key removed, the parts of the lock appearing in side elevation.

Fig. 5 is a detail sectional view on the line 5—5 of Fig. 3, the key being removed.

Fig. 6 is a detail view of the spring for holding the pins of the lock normally in operative position.

Fig. 7 is a detail view of the hinged end of the device, showing the spoke engaging arms.

Corresponding and like parts are referred to in the following description and indicated in all the views of the drawings by the same reference characters.

For the purpose of illustration the invention is shown as applied to a conventional vehicle wheel 1 which is provided with the usual pneumatic tire 2. The locking device includes a pair of opposed and complemental shackle bars 3 which are provided at their inner ends with corresponding knuckles 4 for the reception of a pivot bolt 5, said shackle bars being adapted to be clamped around the felly and tire of the wheel, and being provided at their outer ends with pointed heads which will form a wing projecting radially from the tread of the tire when the device is in operative position. This wing would act initially as a chock to resist rotation of the wheel, but even though a sufficient power might be available to move the automobile or vehicle with the theft preventing device upon the wheel, the radially projecting wing would be periodically brought into engagement with the road with each rotation of the wheel and cause an irregular jumping motion of the vehicle which would attract the attention of any passer-by and render detection practically certain. Furthermore, the wing would dig into the surface of the road at each revolution of the wheel, thereby causing the vehicle to leave a distinctive track which could be easily followed.

The shackle bars 3 are suitably curved to fit around the felly and tire of the wheel, and to engage the sides thereof snugly so that it will be impossible to rotate the device about the wheel and rim to bring the wing into an inoperative position at one side of the wheel. The inner ends of the shackle bars 3 are provided with laterally projecting and inwardly curved spoke engaging arms 6 which will be caused to embrace one of the spokes of the wheel when the theft preventing device is placed in position, thereby preventing any possibility of the device being moved peripherally upon the wheel. These spoke engaging arms 6 are preferably pivotally connected to the inner faces of the shackle bars 3, as indicated at 7, so that they can be swung into the space between the shackle bars when the device is not in use, thereby avoiding objectionable projections from the sides of the device and enabling it to be easily packed and carried in the vehicle. The spoke engaging arms 6 are shown as provided with stop lugs 8 for engagement with the shackle bars to limit the outward swinging movement thereof and hold them in operative position while the device is being applied to a wheel. These stop lugs 8 may fit within recesses 9 in the edges of the shackle bars 3 when they are swung into inoperative position.

The outer end of the shackle bars 3 terminate in the respective heads 10 and 11 which extend transversely across the tread of the tire when the device is in operative position, said heads being substantially triangular in shape so as to coöperate with each other to provide a pointed wing which will project radially from the tread of the tire. The head 10 is comparatively thin, while the head 11 is thick, the overhanging end of each head being adapted to fit over a shoulder 12 adjacent the opposite head, and being provided with an inwardly projecting lug 13 for engagement with a recess 14 in the said shoulder to hold the heads closely together and prevent lateral separation thereof when the shackle bars are closed around a tire. The inner face of the head 10 is formed with a recess 15 which is adapted to be engaged by a transversely slidable bolt 16 mounted within a cylindrical recess 17 in the opposite head 11. This bolt 16 is rigidly connected to a slide 18 terminating in a neck 18ᵃ which projects through a small opening 17ᵃ in the front of the head 11, the sides of the neck 18ᵃ being roughened, as indicated by Fig. 4, so that the neck can be readily grasped by the fingers to move the slide and locking bolt 16. In the present instance the inner end of the slide is shown as formed with a tongue 19 which enters a recess in the locking bolt 16 and is rigidly secured thereto. The upper face of the slide 18 is flat and has a sliding engagement with a block 20 which is fitted within the recess 17 and has a series of pins 21 slidably mounted therein. These pins increase successively in length from the front of the lock toward the rear end thereof and enter corresponding openings in the slide 18, said openings communicating at the lower ends thereof with a key receiving slot 22 which extends longitudinally through the neck 18ᵃ and slide 18. These locking pins 21 are adapted to be forced upwardly by engagement with the beveled shoulders 23 of a key 24. This key is insertible into the slot 22 through the end of the neck 18ᵃ, as indicated by Fig. 3, and when pushed into its final position forces the pins 21 upwardly against the action of the several spring arms 25 so that the slide can be pulled outwardly and the locking bolt 16 retracted into inoperative position, as indicated by Fig. 4. The two heads 10 and 11 of the shackle bars can then be swung apart, as indicated by Fig. 2, preparatory to applying the device to an automobile wheel or removing it therefrom. When the slide 18 is withdrawn the lower ends of the locking pins 21 are received within clearance slots 26 which are formed in the top of the slide 18 and extend inwardly from the pin receiving openings. The spring arms 25 project from a base 36 which is secured by a fastening member 27 to a flange 28 projecting upwardly from the end of the block 20, said block being rigidly secured to the end wall of the recess 17 in some suitable manner as by means of the tongue 29. When the key 24 is fitted in the slot 22 of the slide and forced inwardly to bring the beveled shoulders 23 thereof into engagement with the pins 21, the latter are forced upwardly and disengaged from the slide 18, whereupon the latter can be pulled outwardly to retract the locking bolt 16 into inoperative position. The key 24 can then be removed, and it will be obvious that as soon as the slide 18 is again pushed inwardly to move the locking bolt 16 into operative position the pins 21 will be seated in their respective openings by the action of the spring arms 25. The locking bolt 16 is provided with an opening 30 which is normally in registry with a spring arm 31. The forward end of this spring arm is rigidly secured in position by the before mentioned pin 27, and the spring arm normally rests upon a stop flange 32 projecting upwardly from the block 20. When the locking bolt 16 is retracted the end of the spring arm 31 enters the recess 30, although it will be obvious that if this spring arm should be sprung out of registry with the recess 30, the end thereof will engage the back of the bolt 16 and prevent the latter from being retracted. The arm 31 extends over the top of the pins 21 and when the pins are lifted the proper amount to disengage them from the slide 18, the spring arms 25 which engage the upper end of the pins are just barely brought into engagement with the spring arm 31. However, if an improper key is used and one of these locking pins 21 is forced upwardly a greater amount than is necessary to release the slide 18, the spring arm 31 will be engaged and deflected upwardly, thereby moving the end of the spring arm out of registry with the recess 30 so that it will be impossible to retract the locking bolt. A safe lock is thus provided, since a key which moves any one of the locking pins a trifle too little or a trifle too much will not open the lock. A key of exactly the right shape is necessary, and it is difficult to open such a lock with a false key.

Having thus described the invention, what I claim as new and desire to secure by Letters Patent, is:—

1. A theft preventing device for automobiles, including a pair of complemental shackle bars pivotally connected at their inner ends and shaped to fit around the rim and tire of a wheel, the outer ends of the shackle bars terminating in heads arranged to project radially from the tread of the tire when the device is in position, locking means between the outer ends of the shackle bars, and spoke engaging arms projecting laterally from the inner ends of the shackle bars for engagement with one of the wheel spokes to hold the device against peripheral movement upon the wheel.

2. A theft preventing device for automobiles, including a pair of complemental shackle bars pivotally connected at their inner ends and shaped to fit around the rim and tire of a wheel, the outer ends of the shackle bars terminating in heads arranged to project radially from the tread of the tire when the device is in position, locking means for connecting the outer ends of the shackle bars, and spoke engaging arms projecting laterally from the inner ends of the shackle bars and pivotally connected thereto so as to be folded between the shackle bars when the device is not in use, said arms being adapted to engage one of the wheel spokes to hold the device against peripheral movement upon the wheel.

3. A theft preventing device for automobiles, including a pair of complemental shackle bars pivotally connected at their inner ends and shaped to fit around the rim and tire of a wheel, the outer ends of the shackle bars terminating in heads arranged to project laterally from the tread of the tire when the device is in position thereon, locking means for holding the outer ends of the shackle bars together, spoke engaging arms pivotally connected to the inner ends of the shackle bars and adapted either to be folded between the shackle bars or swung outwardly therefrom, said arms then serving to engage one of the spokes of the wheel to hold the device against peripheral movement thereon, and stop lugs upon the spoke engaging arms for limiting the outward swinging movement thereof, the shackle bars being recessed to receive stops when the stop engaging arms are folded inwardly.

4. A theft preventing device for automobiles, including a pair of complemental shackle bars pivotally connected at their inner ends and shaped to fit around the rim and tire of a wheel, the outer ends of the shackle bars terminating in triangular heads and each head having a shoulder at one side thereof for engagement with the free end of the opposite head, said shoulders being recessed, lugs projecting from the free ends of the heads for engagement with the recesses to hold the heads against lateral spreading, and a pin mounted upon one head and arranged for engagement with the other head to lock the shackle bars in a closed position.

5. A theft preventing device for automobiles, including a pair of complemental shackle bars pivotally connected at their inner ends and shaped to fit around the rim and tire of a wheel, the outer ends of the shackle bars terminating in triangular heads which fit side by side and coöperate with each other to form a wing projecting from the tread of the tire when the device is in operative position, a bolt slidable within one of the heads and adapted to engage the other head to lock the shackle bars in a closed position, and pin locking means controlling the bolt.

In testimony whereof I have signed my name to this specification in the presence of two subscribing witnesses.

LAWRENCE KLINKER.

Witnesses:
 JOHN W. NOBILE,
 RALPH B. BRIAN.